United States Patent
Kusase

(10) Patent No.: US 10,361,614 B2
(45) Date of Patent: Jul. 23, 2019

(54) AC EXCITATION SYNCHRONOUS ROTATING ELECTRIC MACHINE

(71) Applicant: DENSO CORPORATION, Kariya, Aichi-pref. (JP)

(72) Inventor: Shin Kusase, Kariya (JP)

(73) Assignee: DENSO CORPORATION, Kariya (JP)

( * ) Notice: Subject to any disclaimer, the term of this patent is extended or adjusted under 35 U.S.C. 154(b) by 374 days.

(21) Appl. No.: 15/208,124

(22) Filed: Jul. 12, 2016

(65) Prior Publication Data

US 2017/0018981 A1    Jan. 19, 2017

(30) Foreign Application Priority Data

Jul. 17, 2015   (JP) .................................. 2015-143313
Jul. 30, 2015   (JP) .................................. 2015-150628

(51) Int. Cl.
| | |
|---|---|
| *H02K 1/24* | (2006.01) |
| *H02K 21/16* | (2006.01) |
| *H02K 21/04* | (2006.01) |

(52) U.S. Cl.
CPC ............. *H02K 21/046* (2013.01); *H02K 1/24* (2013.01); *H02K 21/16* (2013.01)

(58) Field of Classification Search
CPC .... H02K 21/046; H02K 21/048; H02K 21/12; H02K 21/14; H02K 21/16; H02K 1/00; H02K 1/06; H02K 1/24; H02P 6/28
USPC .... 310/154.02, 156.62, 156.63, 156.68, 162, 310/165; 318/358–542, 700–724
See application file for complete search history.

(56) References Cited

U.S. PATENT DOCUMENTS

| | | | | |
|---|---|---|---|---|
| 5,701,065 A | * | 12/1997 | Ishizaki | ................. H02P 25/03 318/400.17 |
| 2002/0047433 A1 | * | 4/2002 | Sekiyama | ........... B29C 45/5008 310/156.55 |
| 2014/0021818 A1 | * | 1/2014 | Shibata | ................ H02K 21/046 310/156.11 |

FOREIGN PATENT DOCUMENTS

| | | |
|---|---|---|
| JP | 2000-041367 A | 2/2000 |
| JP | 2011067048 A * | 3/2011 |

OTHER PUBLICATIONS

Togashi, Machine Translation of JP2011067048, Mar. 2011 (Year: 2011).*

* cited by examiner

*Primary Examiner* — Quyen P Leung
*Assistant Examiner* — Eric Johnson
(74) *Attorney, Agent, or Firm* — Oliff PLC

(57) ABSTRACT

An AC excitation synchronous rotating electric machine includes a multi-phase coil, an armature core, an outer yoke core, a field-winding-less rotor and a controller. The armature core has the multi-phase coil wound thereon. The rotor is rotatably disposed so as to face the armature core and includes magnetic poles each having a facing portion and a magnetic reluctance portion. The facing portion is provided at one axial end of the magnetic pole so as to face the outer yoke core and allow magnetic flux to flow therebetween. The magnetic reluctance portion is provided at the other axial end of the magnetic pole to impede the magnetic flux from flowing therethrough. The controller controls supply of multi-phase alternating current to the multi-phase coil so that magnetomotive force generated in the armature core is applied to the magnetic poles, thereby causing the magnetic poles to operate as a DC field.

13 Claims, 12 Drawing Sheets

AC EXCITATION SYNCHRONOUS ROTATING ELECTRIC MACHINE

CROSS-REFERENCE TO RELATED APPLICATIONS

This application is based on and claims priority from Japanese Patent Applications No. 2015-143313 filed on Jul. 17, 2015 and No. 2015-150628 filed on Jul. 30, 2015, the contents of which are hereby incorporated by reference in their entireties into this application.

BACKGROUND

1 Technical Field

The present invention relates to AC (Alternating Current) excitation synchronous rotating electric machines which include, at least, a multi-phase coil and an armature core, but no field winding.

2 Description of Related Art

To achieve a small size, high performance, long service life and high reliability, rotating electric machines generally employ a brushless structure with a permanent magnet field. On the other hand, for usage in a wide rotational speed range, it is necessary to vary the field strength. However, with the aforementioned permanent magnet field, it is difficult to vary the field strength; thus losses occur and there are limits on the characteristics of the rotating electric machines. Therefore, one may consider employing a winding field instead of the permanent magnet field. However, the space required for receiving a winding is generally larger than that required for receiving a permanent magnet. Moreover, a winding is generally required to be wound on a core. Consequently, a considerably large volume is required for employing the winding field. As a result, it is difficult to achieve the original object, i.e., to achieve a small size and high performance.

Japanese Patent Application Publication No. JP2000041367A discloses a hybrid excitation synchronous rotating electric machine developed for reducing the overall size, preventing occurrence of magnetic saturation and making high-speed rotation possible. Specifically, in the hybrid excitation synchronous rotating electric machine, a rotor is disposed radially outside a stator so that a back yoke portion of the rotor faces armature cores of the stator with a radial gap formed therebetween. Moreover, the rotor further has a plurality of N-pole permanent magnets, a plurality of S-pole permanent magnets, a first group of core salient poles and a second group of core salient poles, all of which are provided on a radially inner periphery of the back yoke portion of the rotor. The N-pole permanent magnets are arranged alternately with the core salient poles of the first group in a circumferential direction of the rotor. The S-pole permanent magnets are arranged alternately with the core salient poles of the second group in the circumferential direction of the rotor. Furthermore, each of the N-pole permanent magnets is out of axial alignment with any of the S-pole permanent magnets.

However, the hybrid excitation synchronous rotating electric machine disclosed in the above patent document necessitates an excitation winding in addition to an armature coil. Specifically, in the hybrid excitation synchronous rotating electric machine, the excitation winding is embedded in a back yoke portion of the stator. Accordingly, it is necessary for the back yoke portion of the stator to have a considerably large volume so as to allow the excitation winding to be embedded therein. Consequently, it is difficult to achieve a small size of the hybrid excitation synchronous rotating electric machine. In addition, additional manufacturing time is needed for forming the excitation winding and embedding the excitation winding in the back yoke portion of the stator.

SUMMARY

According to exemplary embodiments, there is provided an AC excitation synchronous rotating electric machine which includes a multi-phase coil, an armature core, an outer yoke core, a field-winding-less rotor and a controller. The armature core has the multi-phase coil wound thereon. The rotor is rotatably disposed so as to face the armature core. The rotor includes a plurality of magnetic poles each of which has a facing portion and a magnetic reluctance portion. The facing portion is provided at one axial end of the magnetic pole so as to face the outer yoke core and allow magnetic flux to flow between the facing portion and the outer yoke core. The magnetic reluctance portion is provided at the other axial end of the magnetic pole to impede the magnetic flux from flowing through the magnetic reluctance portion. The controller controls supply of multi-phase alternating current to the multi-phase coil so that magnetomotive force generated in the armature core is applied to the magnetic poles, thereby causing the magnetic poles to operate as a DC field.

With the above configuration, it is possible to solve the problem with the prior art. That is, it is possible to realize a brushless variable field without a field winding. Moreover, since no field winding is employed, it is possible to minimize the size of the AC excitation synchronous rotating electric machine.

In further implementations, it is preferable that the controller controls supply of the multi-phase alternating current to the multi-phase coil to have a phase angle of the magnetomotive force not equal to 0° in electrical angle. Here, the phase angle takes a positive value in a rotational direction of the rotor with a boundary position between one pair of the magnetic poles being a reference position.

It is further preferable that the controller controls supply of the multi-phase alternating current to the multi-phase coil to cause the AC excitation synchronous rotating electric machine to operate as an electric generator with the phase angle of the magnetomotive force being in a range of greater than 0° and less than 90° in electrical angle and as an electric motor with the phase angle being in a range of greater than −90° and less than 0° in electrical angle.

It is further preferable that the controller controls supply of the multi-phase alternating current to the multi-phase coil to have the phase angle of the magnetomotive force being in a range of −10° to −70° or in a range of 10° to 70°.

The multi-phase coil may be configured as a full-pitch coil.

The AC excitation synchronous rotating electric machine may further include a frame that supports, at least, the armature core. In this case, it is preferable that the outer yoke core is provided as a part of the frame.

The AC excitation synchronous rotating electric machine may further include a plurality of magnets each of which is provided on a radially inner surface of one of the magnetic poles and magnetized in a radial direction of the rotor.

For each of the magnetic poles, the facing portion of the magnetic pole may have a pair of collars formed respectively at circumferential ends thereof so as to extend in a circumferential direction of the rotor.

For each of the magnetic poles, the magnetic reluctance portion of the magnetic pole may be constituted of a void space formed at the other axial end of the magnetic pole.

Alternatively, for each of the magnetic poles, the magnetic reluctance portion of the magnetic pole may be constituted of a magnet that is provided at the other axial end of the magnetic pole and magnetized in a direction repelling the magnetic pole.

The facing portions of the magnetic poles may be integrated into one piece by an annular member.

The AC excitation synchronous rotating electric machine may further include a plurality of magnets each of which is provided between one circumferentially-adjacent pair of the magnetic poles and magnetized in a circumferential direction of the rotor.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
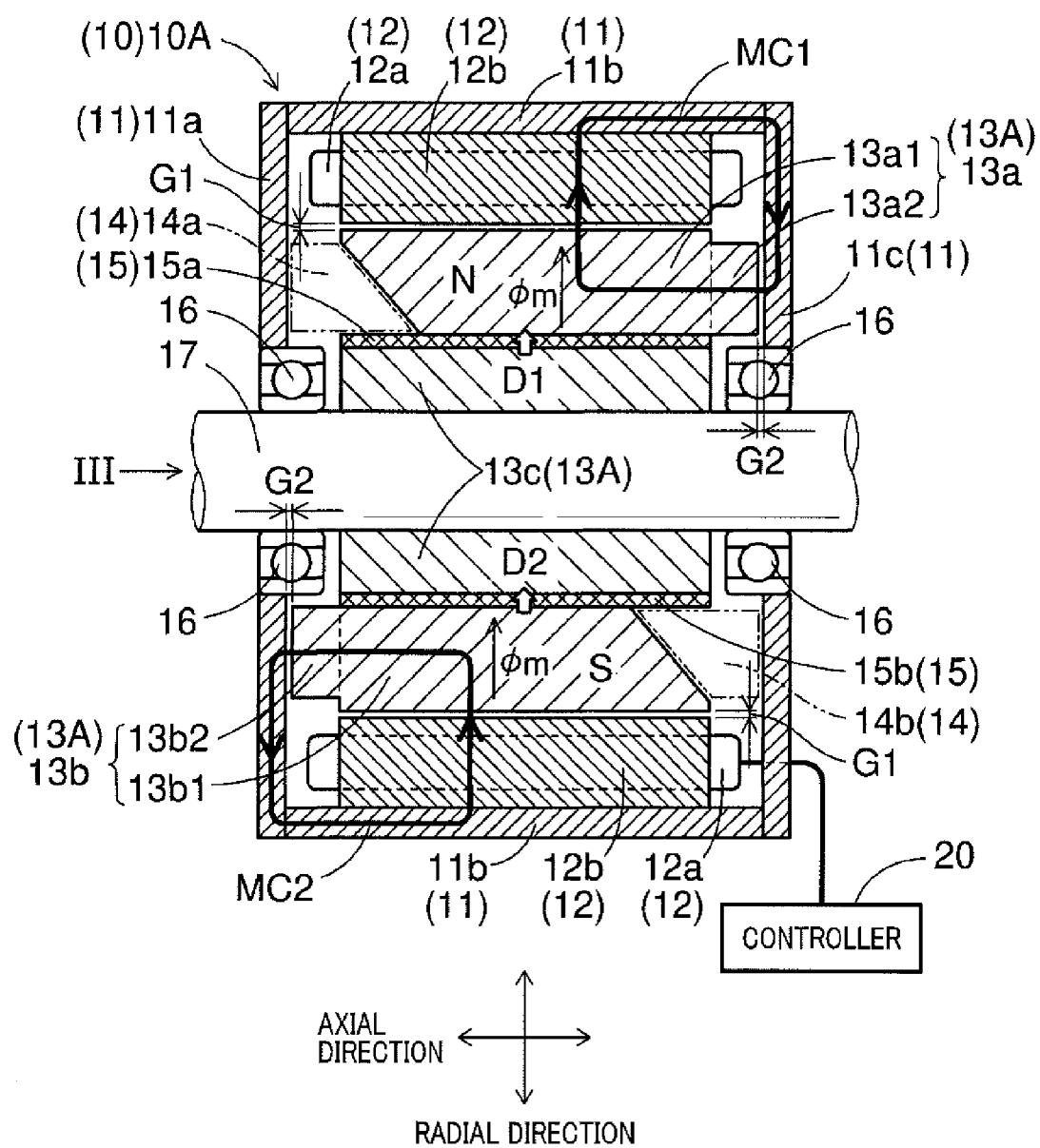
FIG. 1 is a schematic cross-sectional view of an AC excitation synchronous rotating electric machine according to a first embodiment.

Exemplary embodiments will be described hereinafter with reference to FIGS. 1-21. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

[First Embodiment]

FIG. 1 shows the overall configuration of an AC excitation synchronous rotating electric machine 10A according to a first embodiment. The AC excitation synchronous rotating electric machine 10A is a first example of a field-winding-less, AC excitation synchronous rotating electric machine 10 according to the present invention.

In addition, the AC excitation synchronous rotating electric machine 10 according to the present invention may be an electric motor, an electric generator or a motor-generator that selectively functions either as an electric motor or as an electric generator.

As shown in FIG. 1, the AC excitation synchronous rotating electric machine 10A includes a stator 12, a rotor 13A, magnets 15 (or 15a and 15b), a pair of bearings 16 and a rotating shaft 17, all of which are received in a frame (or housing) 11. Moreover, the AC excitation synchronous rotating electric machine 10A also includes a controller 20, which is provided outside the frame 11 in the present embodiment.

In addition, the upper half of FIG. 1 shows a cross section of an upper half of the AC excitation synchronous rotating electric machine 10A which is taken to include a cross section of one of magnetic poles 13a of the rotor 13A; the lower half of FIG. 1 shows a cross section of a lower half of the AC excitation synchronous rotating electric machine 10A which is taken to include a cross section of one of magnetic poles 13b of the rotor 13A.

The frame 11 may be formed of any suitable material into any suitable shape. The frame 11 supports and fixes thereto, at least, the stator 12. Moreover, the frame 11 rotatably supports the rotating shaft 17 via the pair of bearings 16. In the present embodiment, the frame 11 includes, as parts thereof, outer yoke cores 11a and 11c and a back yoke core 11b.

Figure 3:
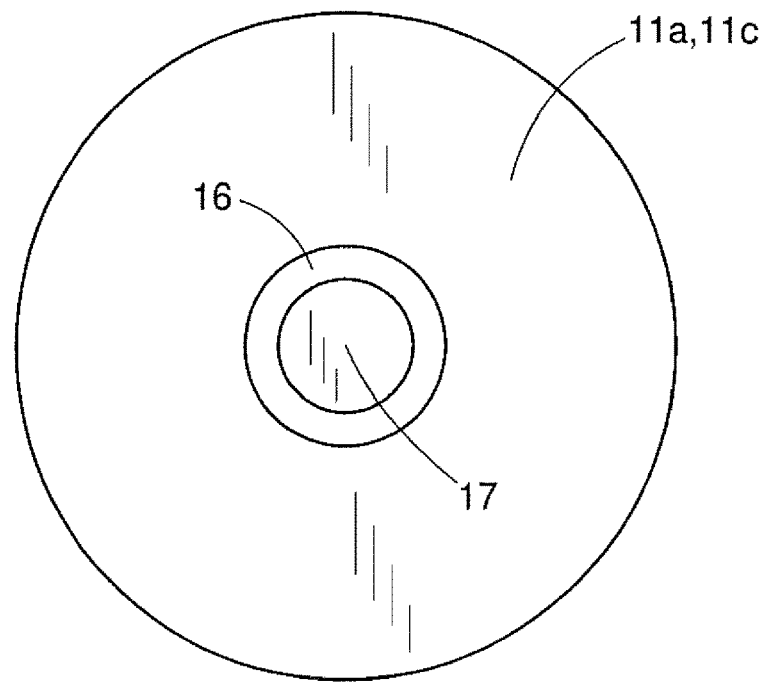
FIG. 3 is a side view along the arrow III in FIG. 1.

Each of the outer yoke cores 11a and 11c is formed into the shape of for example, a hollow disc (or doughnut) as shown in FIG. 3. The outer yoke cores 11a and 11c are located respectively at opposite axial ends of the frame 11 so as to have the stator 12 and the rotor 13A interposed therebetween. The back yoke core 11b is formed into, for example, a hollow cylindrical shape. The back yoke core 11b is interposed between and connected with the outer yoke cores 11a and 11c.

In the present embodiment, the outer yoke core 11c, the back yoke core 11b, the magnetic poles 13a of the rotor 13A and an armature core 12b of the stator 12 together form a magnetic circuit MC1. On the other hand, the outer yoke core 11a, the back yoke core 11b, the magnetic poles 13b of the rotor 13A and the armature core 12b of the stator 12 together form a magnetic circuit MC2.

It should be noted that the outer yoke cores 11a and 11c, which are also referred to as bypass yoke cores, may be formed of any suitable material into any suitable shape such that they can form, together with the magnetic poles 13a and 13b of the rotor 13A and the armature core 12b of the stator 12, the magnetic circuits MC1 and MC2. In addition, the directions of the magnetic circuits MC1 and MC2 are indicated by arrows in FIG. 1 only by way of example; the directions may be reversed depending on time and position.

The stator (or armature) 12 includes a multi-phase coil 12a and the aforementioned armature core 12b. The multi-phase coil (or armature coil) 12a is wound on the armature core 12b.

In the present embodiment, the multi-phase coil 12a is configured as a three-phase coil; however, the number of phases of the multi-phase coil 12a may be greater than 3. In addition, the multi-phase coil 12a may be formed of either a single continuous conductor wire or a plurality of conductor wires (or conductor segments) that are electrically connected with each other.

The rotor 13A is a first example of a field-winding-less rotor 13 according to the present invention. The rotor 13A includes the aforementioned magnetic poles 13a, the aforementioned magnetic poles 13b, a supporting member 13c, a plurality of magnets 15a and a plurality of magnets 15b.

The magnetic poles 13a have a first polarity (e.g., North (N) in the present embodiment). The magnetic poles 13a are fixed to the rotating shaft 17 via the magnets 15a and the supporting member 13c. The magnetic poles 13b have a second polarity (e.g., South (S) in the present embodiment) that is opposite to the first polarity. The magnetic poles 13b are fixed to the rotating shaft 17 via the magnets 15b and the supporting member 13c. Consequently, the magnetic poles 13a and 13b can rotate together with the rotating shaft 17.

Figure 2:
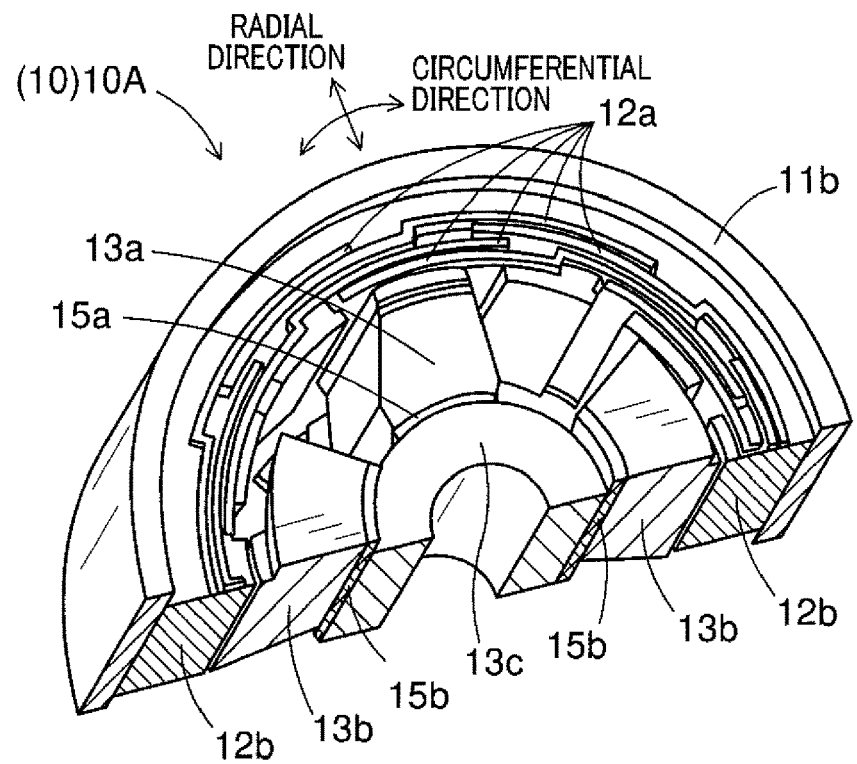
FIG. 2 is a schematic perspective view of part of the AC excitation synchronous rotating electric machine according to the first embodiment.
Figure 4:
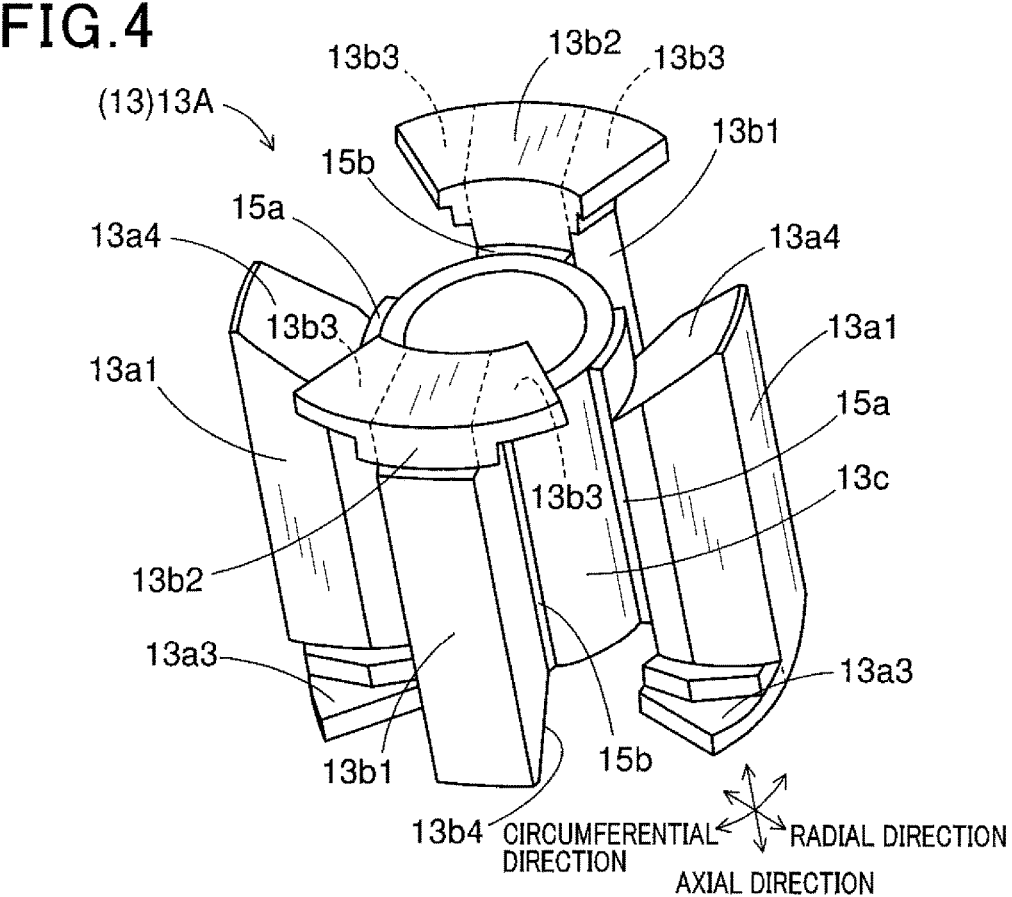
FIG. 4 is a schematic perspective view of a rotor of the AC excitation synchronous rotating electric machine according to the first embodiment.

Moreover, as shown in FIGS. 2 and 4, the magnetic poles 13a are arranged alternately with the magnetic poles 13b in the circumferential direction of the rotor 13A (or the circumferential direction of the AC excitation synchronous rotating electric machine 10A).

It should be noted that the magnetic poles 13a and 13b may be formed of any suitable magnetic material into any suitable shape such that magnetic flux can flow through them. For example, the magnetic poles 13a and 13b may be formed of a soft-magnetic material, magnets or a combination of a soft-magnetic material and magnets. In addition, the number of the magnetic poles 13a and the number of the magnetic poles 13b may be set to any suitable numbers.

The supporting member 13c is formed of a nonmagnetic material into, for example, a hollow cylindrical shape. The supporting member 13c is fixedly fitted on the rotating shaft 17.

The magnets 15a and 15b are an example of magnets 15 according to the present invention. Each of the magnets 15a is provided on a radially inner surface of one of the magnetic poles 13a and magnetized in a radial direction (e.g., the direction D1 in FIG. 1). On the other hand, each of the magnets 15b is provided on a radially inner surface of one of the magnetic poles 13b and magnetized in a radial direction (e.g., the direction D2 in FIG. 1). In addition, the magnets 15a and 15b may be of any type.

Magnetic flux $\phi m$ caused by the magnets 15a and 15b (i.e., magnet magnetic flux $\phi m$) acts on the magnetic circuits MC1 and MC2, producing magnet torque.

Between the armature core 12b and each of the magnetic poles 13a and 13b, there is formed a radial gap G1. Moreover, between the outer yoke core 11c and each of the magnetic poles 13a, there is formed an axial gap G2; between the outer yoke core 11a and each of the magnetic poles 13b, there is also formed an axial gap G2. The sizes (or widths) of the radial and axial gaps G1 and G2 can be set to any suitable values to the extent that the magnetic circuits MC1 and MC2 can be formed. In addition, the size of the radial gap G1 may be set to be either equal to or different from the size of the axial gaps G2.

Referring to FIGS. 1 and 4, each of the magnetic poles 13a includes a main body 13a1, a facing portion 13a2 that includes a pair of collars 13a3, and a taper portion 13a4. The facing portion 13a2 is formed at one axial end (i.e., the right end in FIG. 1 and the lower end in FIG. 4) of the main body 13a1 so as to extend in the circumferential direction of the rotor 13A. The facing portion 13a2 has the pair of collars 13a3 formed respectively at circumferential ends thereof. The facing portion 13a2 faces the outer yoke core 11c in the axial direction of the rotor 13A (see FIG. 1). The taper portion 13a4 is formed at the other axial end (i.e., the left end in FIG. 1 and the upper end in FIG. 4) of the main body 13a1 so as to taper in the axial direction away from the main body 13a1.

Similarly, each of the magnetic poles 13b includes a main body 13b1, a facing portion 13b2 that includes a pair of collars 13b3, and a taper portion 13b4. The facing portion 13b2 is formed at one axial end (i.e., the left end in FIG. 1 and the upper end in FIG. 4) of the main body 13b1 so as to extend in the circumferential direction of the rotor 13A. The facing portion 13b2 has the pair of collars 13b3 formed respectively at circumferential ends thereof. The facing portion 13b2 faces the outer yoke core 11a in the axial direction of the rotor 13A (see FIG. 1). The taper portion 13b4 is formed at the other axial end (i.e., the right end in FIG. 1 and the lower end in FIG. 4) of the main body 13b1 so as to taper in the axial direction away from the main body 13b1.

The magnetic poles 13a and 13b are arranged so that the facing portions 13a2 of the magnetic poles 13a face the outer yoke core 11c and the facing portions 13b2 of the magnetic poles 13b face the outer yoke core 11a. That is, the orientation of the magnetic poles 13a is opposite to that of the magnetic poles 13b in the axial direction of the rotor 13A. Consequently, as shown in FIG. 1, in the AC excitation synchronous rotating electric machine 10A, there are formed void spaces 14a between the magnetic poles 13a and the outer yoke core 11a and void spaces 14b between the magnetic poles 13b and the outer yoke core 11c. Each of the void spaces 14a and 14b constitutes a magnetic reluctance portion 14 that impedes flow of magnetic flux.

Figure 5:
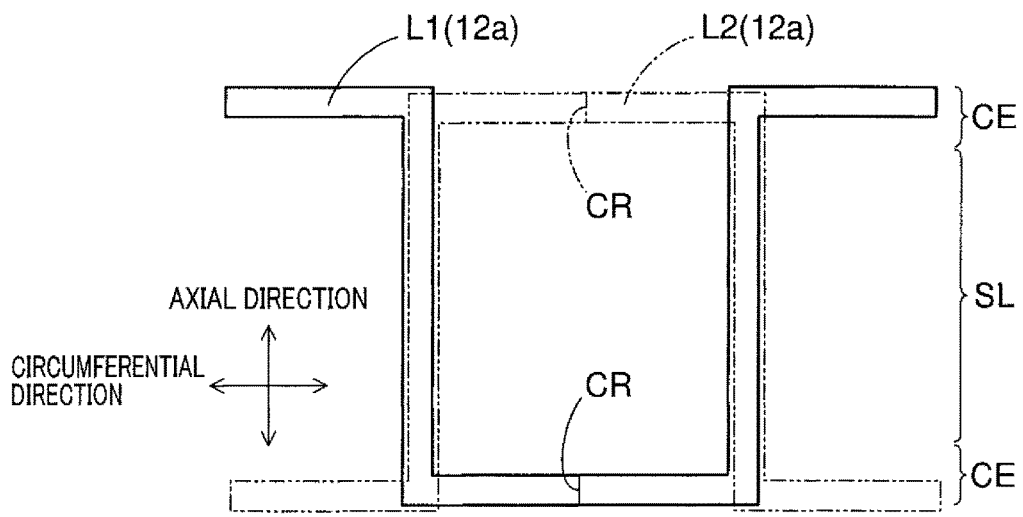
FIG. 5 is a plan view illustrating the configuration of windings used for forming a multi-phase coil of the AC excitation synchronous rotating electric machine according to the first embodiment.
Figure 6:
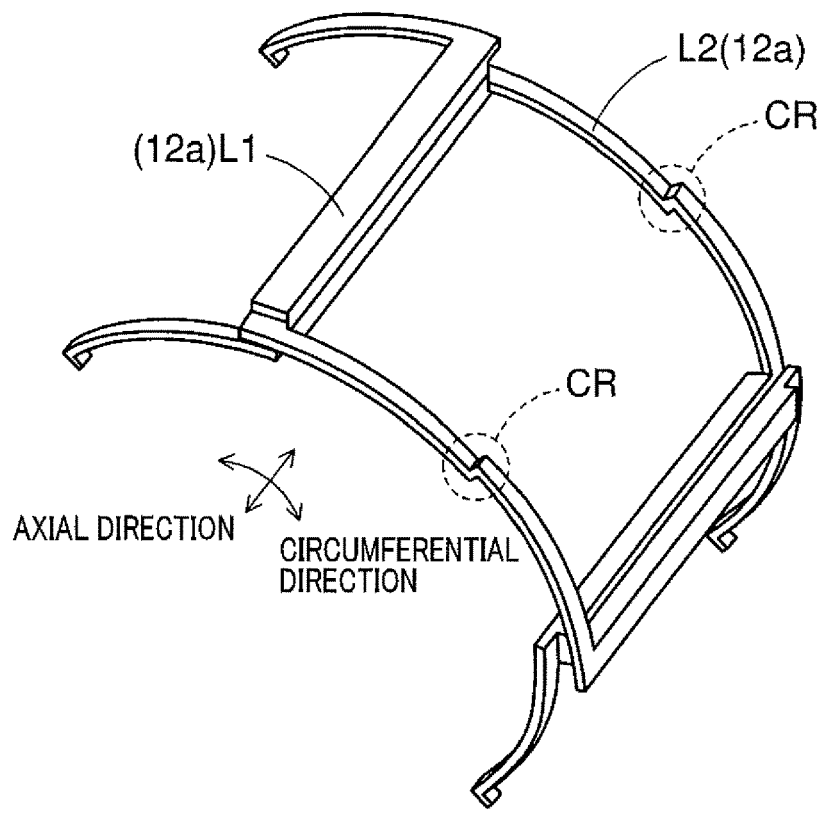
FIG. 6 is a perspective view illustrating the configuration of the windings used for forming the multi-phase coil.

Referring to FIGS. 5 and 6, in the present embodiment, each phase of the multi-phase coil 12a is formed of a pair of windings L1 and L2. In addition, in FIG. 5, for the sake of ease of understanding, the winding L1 is shown with a continuous line, and the winding L2 is shown with a two-dot chain line and slightly shifted from the actual position of the winding L2.

As shown in FIGS. 5 and 6, each of the windings L1 and L2 is wave-shaped so as to meander alternately in the axial and circumferential directions. In addition, in the present embodiment, each of the windings L1 and L2 is a full-pitch winding (i.e., wound on the armature core 12b at a circumferential pitch that is 180° in electrical angle).

Moreover, each of the windings L1 and L2 includes a plurality of in-slot portions SL and a plurality of end portions (or turn portions) CE. Each of the in-slot portions SL is received in one of slots (not shown) of the armature core 12b. Each of the end portions CE is located outside the slots of the armature core 12b and connects one circumferentially-adjacent pair of the in-slot portions SL. That is, each of the end portions CE protrudes from the armature core 12b. Further, each of the end portions CE includes a crank-shaped part CR that is radially bent. In addition, the windings L1 and L2 are circumferentially offset from each other by one end portion CE.

Figure 7:
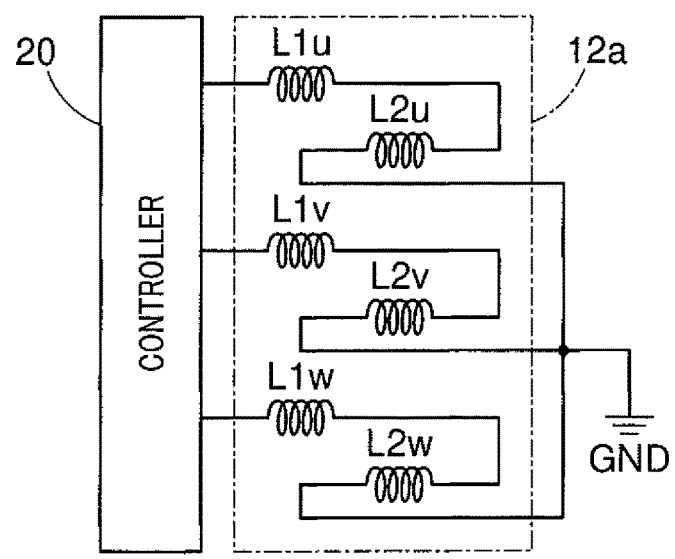
FIG. 7 is a schematic connection diagram illustrating the electrical connection between the multi-phase coil and a controller of the AC excitation synchronous rotating electric machine according to the first embodiment.

FIG. 7 shows the electrical connection between the controller 20 and the multi-phase coil 12a.

In the present embodiment, the multi-phase coil 12a is a three-phase coil that includes U, V and W-phases. The U phase is formed of the pair of windings L1 and L2 both of which are suffixed with "u"; the V phase is formed of the pair of windings L1 and L2 both of which are suffixed with "v"; the W phase is formed of the pair of windings L1 and L2 both of which are suffixed with "w".

As shown in FIG. 7, the U-phase windings L1u and L2u are serially connected with each other between the controller 20 and the ground GND. More specifically, the U-phase winding L1u has a first end connected to the controller 20 and a second end connected to a first end of the U-phase winding L2u; a second end of the U-phase winding L2u is connected to the ground GND.

Similarly, the V-phase windings L1v and L2v are serially connected with each other between the controller 20 and the ground GND. More specifically, the V-phase winding L1v has a first end connected to the controller 20 and a second end connected to a first end of the V-phase winding L2v; a second end of the V-phase winding L2v is connected to the ground GND.

The W-phase windings L1w and L2w are serially connected with each other between the controller 20 and the ground GND. More specifically, the W-phase winding L1w has a first end connected to the controller 20 and a second end connected to a first end of the W-phase winding L2w; a second end of the W-phase winding L2w is connected to the ground GND.

In addition, the ground GND represents a common reference electric potential and is set to 0V in the present embodiment. However, it should be appreciated that the ground GND may also be set to any other suitable value.

With the above electrical connection between the controller 20 and the multi-phase coil 12a, when viewed from the controller 20 side in FIG. 7, U-phase current Iu flows in the U-phase windings L1u and L2u respectively in opposite directions; V-phase current Iv flows in the V-phase windings L1v and L2v respectively in opposite directions; and W-phase current Iw flows in the W-phase windings L1w and L2w respectively in opposite directions.

Figure 8:
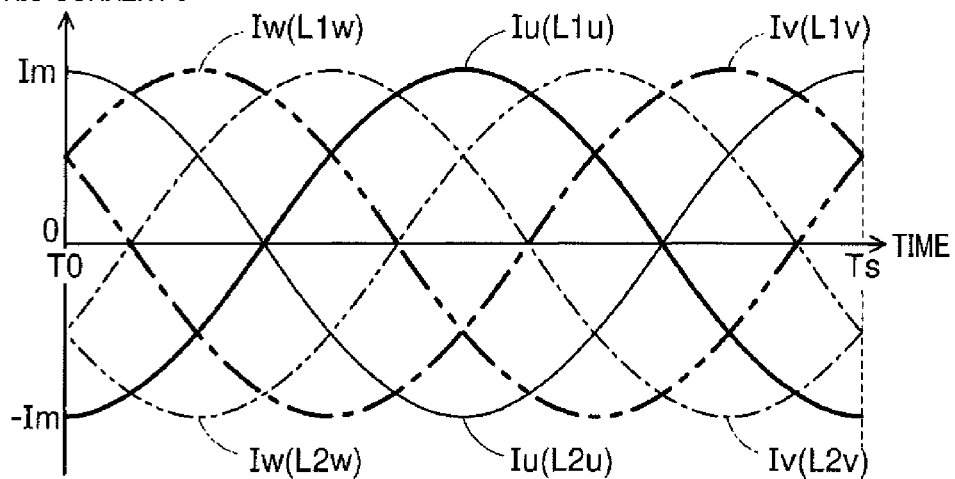
FIG. 8 is a waveform chart illustrating the control, by the controller, of multi-phase alternating current supplied to the multi-phase coil.

FIG. 8 shows the U-phase, V-phase and W-phase currents Iu, Iv and Iw supplied by the controller 20 to the U-phase, V-phase and W-phase windings L1u, L2u, L1v, L2v, L1w and L2w. More specifically, in FIG. 8, the U-phase current Iu supplied to the U-phase winding L1u is shown with a bold continuous line; the U-phase current Iu supplied to the U-phase winding L2u is shown with a fine continuous line; the V-phase current Iv supplied to the V-phase winding L1v is shown with a bold one-dot chain line; the V-phase current Iv supplied to the V-phase winding L2v is shown with a fine one-dot chain line; the W-phase current Iw supplied to the W-phase winding L1w is shown with a bold two-dot chain line; the W-phase current Iw supplied to the W-phase winding L2w is shown with a fine two-dot chain line.

In the present embodiment, it is possible to cause the magnetic poles 13a and 13b of the rotor 13A to operate (or function) as a DC (Direct Current) field by applying (or introducing) magnetomotive force to the magnetic poles 13a and 13b; the magnetomotive force is generated in the armature core 12b upon supply of the multi-phase alternating current I (i.e., the U-phase, V-phase and W-phase currents Iu, Iv and Iw) to the multi-phase coil 12a.

Specifically, referring to FIG. 8, let the length of time from a time instant T0 to a time instant Ts be one period of the multi-phase alternating current I. Moreover, referring to FIG. 9, a phase angle β is an electrical angle between the rotating magnetomotive force, which is generated by supplying the multi-phase alternating current I to the multi-phase coil 12a, and the magnetic poles 13a and 13b of the rotor 13A.

Figure 9:
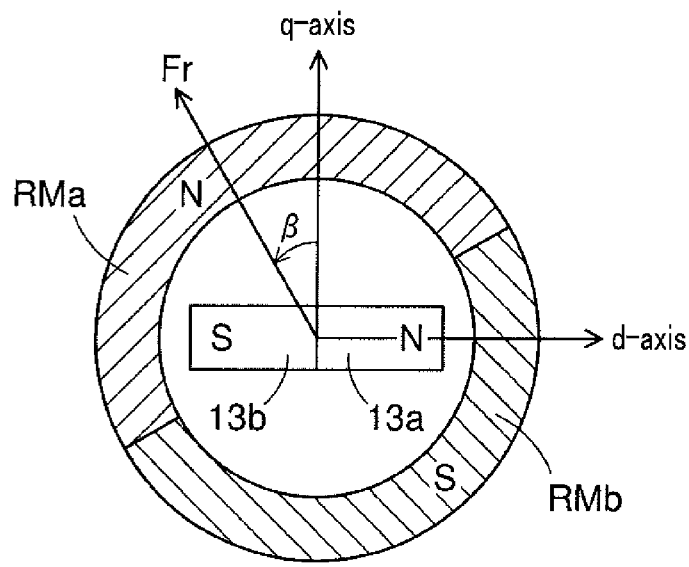
FIG. 9 is a schematic view illustrating a phase angle controlled by the controller.

FIG. 9 illustrates a two-pole model that models the relationship between the rotating magnetic field, which is created in the armature core 12b upon supply of the multi-phase alternating current I to the multi-phase coil 12a, and the magnetic poles 13a and 13b of the rotor 13A.

In FIG. 9, RMa and RMb represent magnetic poles of the rotating magnetic field that is created in the armature core 12b upon supply of the multi-phase alternating current I to the multi-phase coil 12a. The rotating magnetic poles RMa and RMb are respectively magnetized into polarities (i.e., N and S poles) as indicated by arrows in FIG. 9. Moreover, the rotating magnetic poles RMa and RMb rotate in, for example, a rotational direction Dr indicated by an arrow in FIG. 7. The rotating magnetomotive force of the rotating magnetic field corresponds to an "armature magnetomotive force" and is designated as a vector by Fr in FIG. 7. In addition, a d-axis (pole center) and a q-axis (pole boundary) of one magnetic pole 13a of the rotor 13A are also indicated by arrows in FIG. 7.

The phase angle β is represented by an angle between the boundary position between one pair of the magnetic poles 13a and 13b (i.e., the q-axis in FIG. 9) and the rotating magnetomotive force Fr; the phase angle β takes a positive value in the rotational direction Dr with the boundary position being a reference position. In other words, the phase angle β is equal to 0 when the direction of the rotating magnetomotive force Fr coincides with the q-axis.

In addition, though FIG. 9 illustrates an example where the rotational direction Dr coincides with the counterclockwise direction, the following explanation can also be applied to an example where the rotational direction Dr coincides with the clockwise direction. Therefore, no example where the rotational direction Dr coincides with the clockwise direction is shown in the figures. Moreover, when the rotational direction Dr coincides with the clockwise direction, the phase angle β takes a positive value in the clockwise direction. Furthermore, though FIG. 9 illustrates a two-pole model, the following explanation can also be applied to models of four or more poles.

In the AC excitation synchronous rotating electric machine 10A, the flow of magnetic flux φr changes according to the phase angle β that is controlled by the controller 20.

Figure 10:
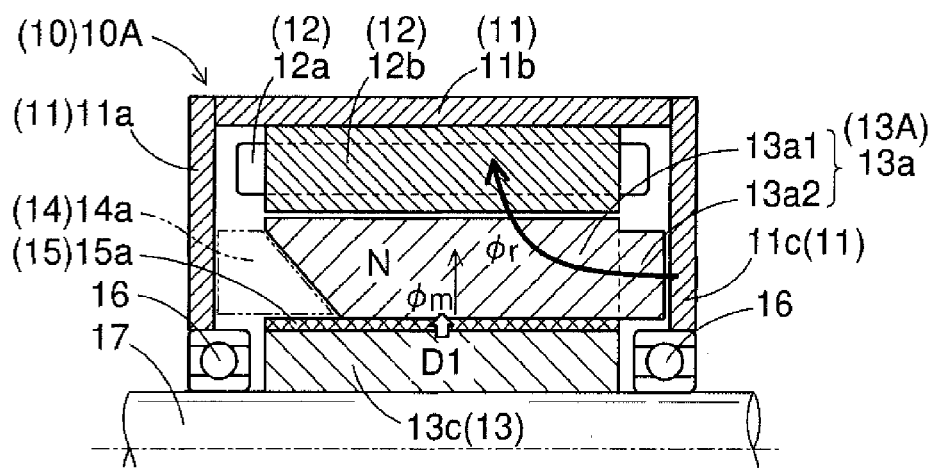
FIG. 10 is a schematic cross-sectional view illustrating the flows of magnetic fluxes in the AC excitation synchronous rotating electric machine according to the first embodiment when the phase angle has a negative value.

Specifically, FIG. 10 illustrates both the flow of the magnetic flux φr and the flow of the magnetic flux φm when the phase angle β is greater than 0° and less than 90° (i.e., 0°<β<90°). In this case, the magnetic flux φr flows from the outer yoke core 11c to the armature core 12b via the magnetic poles 13a of the rotor 13A (see the magnetic circuit MC1 shown in FIG. 1). Moreover, though not shown in the figures, the magnetic flux φr also flows from the armature core 12b to the outer yoke core 11a via the magnetic poles 13b of the rotor 13A (see the magnetic circuit MC2 shown in FIG. 1). Furthermore, the magnetic flux φm, which is caused by the magnets 15a and 15b, flows to the armature core 12b via the magnetic poles 13a of the rotor 13A, thereby being added to the magnetic flux φr. When 0°<β<90°, the AC excitation synchronous rotating electric machine 10A functions as an electric generator.

Figure 11:
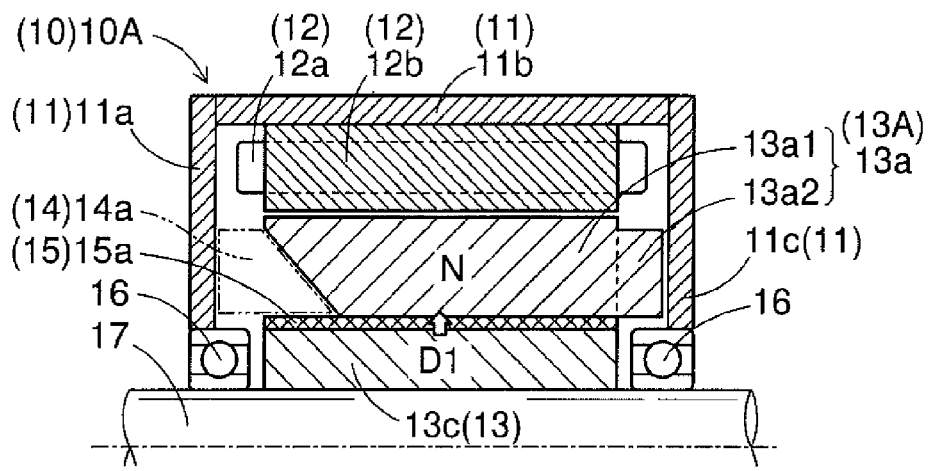
FIG. 11 is a schematic cross-sectional view illustrating the flows of magnetic fluxes in the AC excitation synchronous rotating electric machine according to the first embodiment when the phase angle is 0.

Referring now to FIG. 11, when the phase angle β is equal to 0°, almost no magnetic flux φr flows in the AC excitation synchronous rotating electric machine 10A. In this case, the AC excitation synchronous rotating electric machine 10A functions neither as an electric generator nor as an electric motor.

Figure 12:
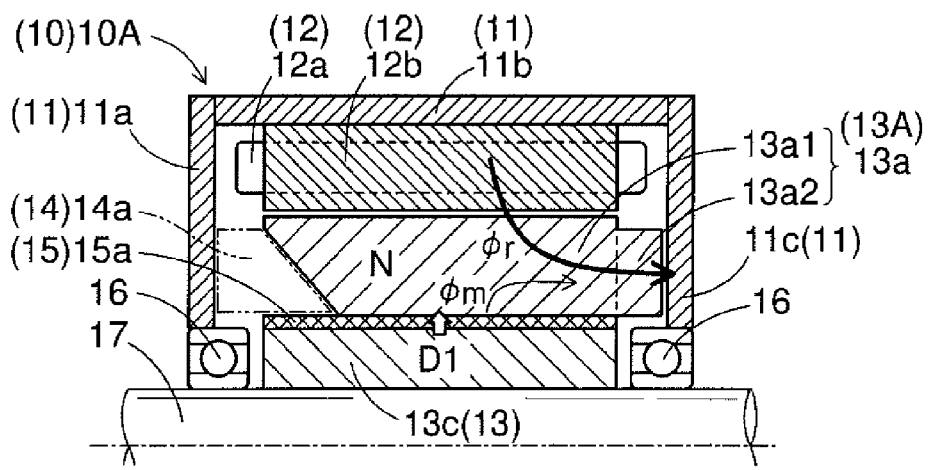
FIG. 12 is a schematic cross-sectional view illustrating the flows of magnetic fluxes in the AC excitation synchronous rotating electric machine according to the first embodiment when the phase angle has a positive value.

FIG. 12 illustrates both the flow of the magnetic flux φr and the flow of the magnetic flux φm when the phase angle β is greater than −90° and less than 0° (i.e., −90°<β<0°). In this case, in contrast to the case shown in FIG. 10, the magnetic flux φr flows from the armature core 12b to the outer yoke core 11c via the magnetic poles 13a of the rotor 13A. Moreover, though not shown in the figures, the magnetic flux φr also flows from the outer yoke core 11a to the armature core 12b via the magnetic poles 13b of the rotor 13A. Furthermore, the magnetic flux φm, which is caused by the magnets 15a and 15b, flows to the outer yoke core 11c via the magnetic poles 13a of the rotor 13A, thereby being added to the magnetic flux φr. When −90°<β<0°, the AC excitation synchronous rotating electric machine 10A functions as an electric motor.

Figure 13:
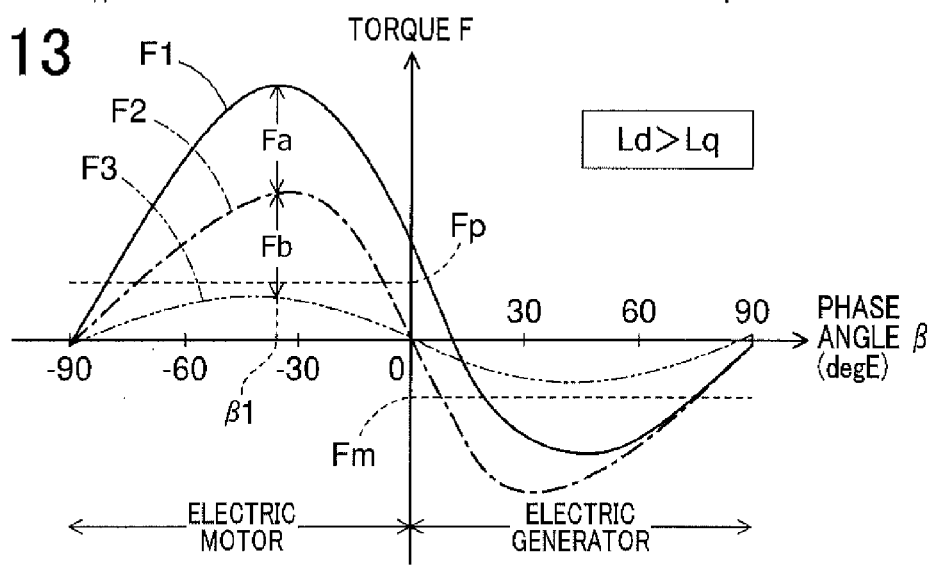
FIG. 13 is a graphical representation illustrating the relationship between the phase angle and torque of the AC excitation synchronous rotating electric machine according to the first embodiment.

FIG. 13 shows the relationship between the phase angle β and torque F. More specifically, in FIG. 13, a characteristic line F1, which is drawn as a continuous line, represents the relationship between the phase angle β and the torque F of the AC excitation synchronous rotating electric machine 10A according to the present embodiment. A characteristic line F2, which is drawn as a one-dot chain line, represents the relationship between the phase angle β and the torque F of the AC excitation synchronous rotating electric machine 10A from which the magnets 15a and 15b are removed. A characteristic line F3, which is drawn as a two-dot chain line, represents the relationship between the phase angle β and the reluctance torque component (i.e., the torque component resulting from the regular saliency of the magnetic poles 13a and 13b of the rotor 13A) of the torque F of the AC excitation synchronous rotating electric machine 10A from which the magnets 15a and 15b are removed. Moreover, to allow the magnetic poles 13a and 13b of the rotor 13A to have the regular saliency, the d-axis inductance Ld is set to be greater than the q-axis inductance Lq (i.e., Ld>Lq). In addition, [degE] in FIG. 13 denotes "degrees in electrical angle".

As shown in FIG. 13, at a value β1 of the phase angle β, there are a torque difference Fa between the characteristic lines F1 and F2 and a torque difference Fb between the characteristic lines F2 and F3. The torque difference Fa is caused by the magnet torque that is produced by the magnets 15a and 15b provided in the rotor 13A. The torque difference Fb is caused by the exciting current torque that is produced by supplying the multi-phase alternating current I (i.e., the U-phase, V-phase and W-phase currents Iu, Iv and Iw) to the multi-phase coil 12a. That is, by providing the outer yoke cores 11a and 11c in the AC excitation synchronous rotating electric machine 10A, it becomes possible to utilize the magnetomotive force generated in the end portions CE of the U-phase, V-phase and W-phase windings L1u, L2u, L1v, L2v, L1w and L2w of the multi-phase coil 12a.

It is preferable for the controller 20 to set the phase angle β in a range where the magnitude of the torque F of the AC excitation synchronous rotating electric machine 10A is greater than the maximum magnitude of the characteristic line F3. More specifically, referring to FIG. 13, the range where the magnitude of the torque F is greater than the maximum magnitude of the characteristic line F3 may be a part of the range of −90°<β<0° where the torque F is higher than or equal to a desired torque Fp or a part of the range of 0°<β<90° where the torque F is lower than or equal to a desired torque Fm. Moreover, to secure the magnitude of the torque F being considerably greater than that of the torque of a conventional rotating electric machine which includes no outer yoke cores 11a and 11c, it is preferable for the controller 20 to control the phase angle β to be within the range of −70°≤β≤−10° or the range of +10°≤β≤+70°.

According to the present embodiment, it is possible to achieve the following advantageous effects.

(1) In the present embodiment, the AC excitation synchronous rotating electric machine 10A includes the multi-phase coil 12a, the armature core 12b, the outer yoke cores 11a and 11c, the field-winding-less rotor 13A and the controller 20. The armature core 12b has the multi-phase coil 12a wound thereon. The outer yoke cores 11a and 11c are located respectively on opposite axial sides of the armature core 12b so as to axially face the multi-phase coil 12a and the armature core 12b. The field-winding-less rotor 13A is rotatably disposed so as to radially face the armature core 12b. The rotor 13A includes the magnetic poles 13a and 13b. Each of the magnetic poles 13a has the facing portion 13a2 and the magnetic reluctance portion 14. The facing portion 13a2 is provided at one axial end of the magnetic pole 13a so as to face the outer yoke core 11c and allow the magnetic flux φr to flow between the facing portion 13a2 and the outer yoke core 11c. The magnetic reluctance portion 14 is provided at the other axial end of the magnetic pole 13a to impede the magnetic flux φr from flowing through the magnetic reluctance portion 14. Each of the magnetic poles 13b has the facing portion 13b2 and the magnetic reluctance portion 14. The facing portion 13b2 is provided at one axial end of the magnetic pole 13b so as to face the outer yoke core 11a and allow the magnetic flux φr to flow between the facing portion 13b2 and the outer yoke core 11a. The magnetic reluctance portion 14 is provided at the other axial end of the magnetic pole 13b to impede the magnetic flux φr from flowing through the magnetic reluctance portion 14. The controller 20 controls supply of the multi-phase alternating current I (i.e., the U-phase, V-phase and W-phase currents Iu, Iv and Iw) to the multi-phase coil 12a so that the magnetomotive force generated in the armature core 12b is applied to the magnetic poles 13a and 13b, thereby causing the magnetic poles 13a and 13b to operate as a DC field.

With the above configuration, it is possible to solve the problem with the prior art. That is, it is possible to realize a brushless variable field without a field winding. Moreover, since no field winding is employed, it is possible to minimize the size of the AC excitation synchronous rotating electric machine 10A.

(2) In the present embodiment, the controller 20 controls supply of the multi-phase alternating current I to the multi-phase coil 12a so as to have the phase angle β of the magnetomotive force not equal to 0° in electrical angle.

With the above control, it is possible to reliably cause the magnetic poles 13a and 13b to operate as a DC field upon application of the magnetomotive force to the magnetic poles 13a and 13b.

(3) Moreover, in the present embodiment, the controller 20 controls supply of the multi-phase alternating current I to the multi-phase coil 12a to cause the AC excitation synchronous rotating electric machine 10A to operate as an electric generator with the phase angle β being in the range of greater than 0° and less than 90° in electrical angle and as an electric motor with the phase angle β being in the range of greater than −90° and less than 0° in electrical angle.

With the above control, it is possible to easily shift the operation of the AC excitation synchronous rotating electric machine 10A between an electric generator and an electric motor.

(4) Furthermore, in the present embodiment, the controller 20 controls supply of the multi-phase alternating current I to the multi-phase coil 12a so as to keep the phase angle β in the range of −10° to −70° or in the range of 10° to 70°.

With the above control, it is possible to secure the magnitude of the torque F of the AC excitation synchronous rotating electric machine 10A to be considerably greater than that of the torque of a conventional rotating electric machine which includes no outer yoke cores 11a and 11c.

(5) In the present embodiment, the multi-phase coil 12a is configured as a full-pitch coil. That is, each of the U-phase, V-phase and W-phase windings L1u, L2u, L1v, L2v, L1w and L2w is wound on the armature core 12b at a circumferential pitch that is 180° in electrical angle.

With the above configuration, it is possible to increase the induced electromotive force and generate the same magnetomotive force at portions of the armature core 12b which are separated from each other by 180° in mechanical angle.

(6) In the present embodiment, each of the outer yoke cores 11a and 11c is provided as a part of the frame 11. The frame 11 supports, at least, the stator 12 that includes the multi-phase coil 12a and the armature core 12b.

With the above configuration, it is possible to reduce the parts count and the manufacturing cost of the AC excitation synchronous rotating electric machine 10A.

(7) In the present embodiment, the AC excitation synchronous rotating electric machine 10A further includes the magnets 15a and 15b. Each of the magnets 15a is provided on the radially inner surface of one of the magnetic poles 13a and magnetized in the radial direction of the rotor 13A. Each of the magnets 15b is provided on the radially inner surface of one of the magnetic poles 13b and magnetized in the radial direction of the rotor 13A.

With the magnets 15a and 15b, the magnet torque is produced in addition to the reluctance torque produced by the magnetic flux ϕr flowing through the magnetic poles 13a and 13b. Consequently, the total torque F of the AC excitation synchronous rotating electric machine 10A is increased. Moreover, by providing the magnets 15a and 15b respectively on the radially inner surfaces of the magnetic poles 13a and 13b, it is possible to secure high resistance of the magnets 15a and 15b to the centrifugal force during rotation of the rotor 13A.

(8) In the present embodiment, for each of the magnetic poles 13a, the facing portion 13a2 of the magnetic pole 13a has the pair of collars 13a3 formed respectively at the circumferential ends thereof so as to extend in the circumferential direction of the rotor 13A. For each of the magnetic poles 13b, the facing portion 13b2 of the magnetic pole 13b has the pair of collars 13b3 formed respectively at the circumferential ends thereof so as to extend in the circumferential direction of the rotor 13A.

With the collars 13a3 of the facing portions 13a2, it is possible to increase the regions (or areas) through which the magnetic flux ϕr flows between the facing portions 13a2 and the outer yoke core 11c. Similarly, with the collars 13b3 of the facing portions 13b2, it is possible to increase the regions (or areas) through which the magnetic flux ϕr flows between the facing portions 13b2 and the outer yoke core 11a. Consequently, it is possible to facilitate the flows of the magnetic flux ϕr between the facing portions 13a2 and the outer yoke core 11c and between the facing portions 13b2 and the outer yoke core 11a, thereby increasing the total torque F of the AC excitation synchronous rotating electric machine 10A.

(9) In the present embodiment, for each of the magnetic poles 13a, the magnetic reluctance portion 14 of the magnetic pole 13a is constituted of the void space 14a formed between the magnetic pole 13a and the outer yoke core 11a. For each of the magnetic poles 13b, the magnetic reluctance portion 14 of the magnetic pole 13b is constituted of the void space 14b formed between the magnetic pole 13b and the outer yoke core 11c.

With the above configuration, it is possible to easily realize the magnetic reluctance portions 14 of the magnetic poles 13a and 13b. Consequently, it is possible to reliably prevent leakage of the magnetic flux ϕr with a simple structure.

[Second Embodiment]

Figure 14:
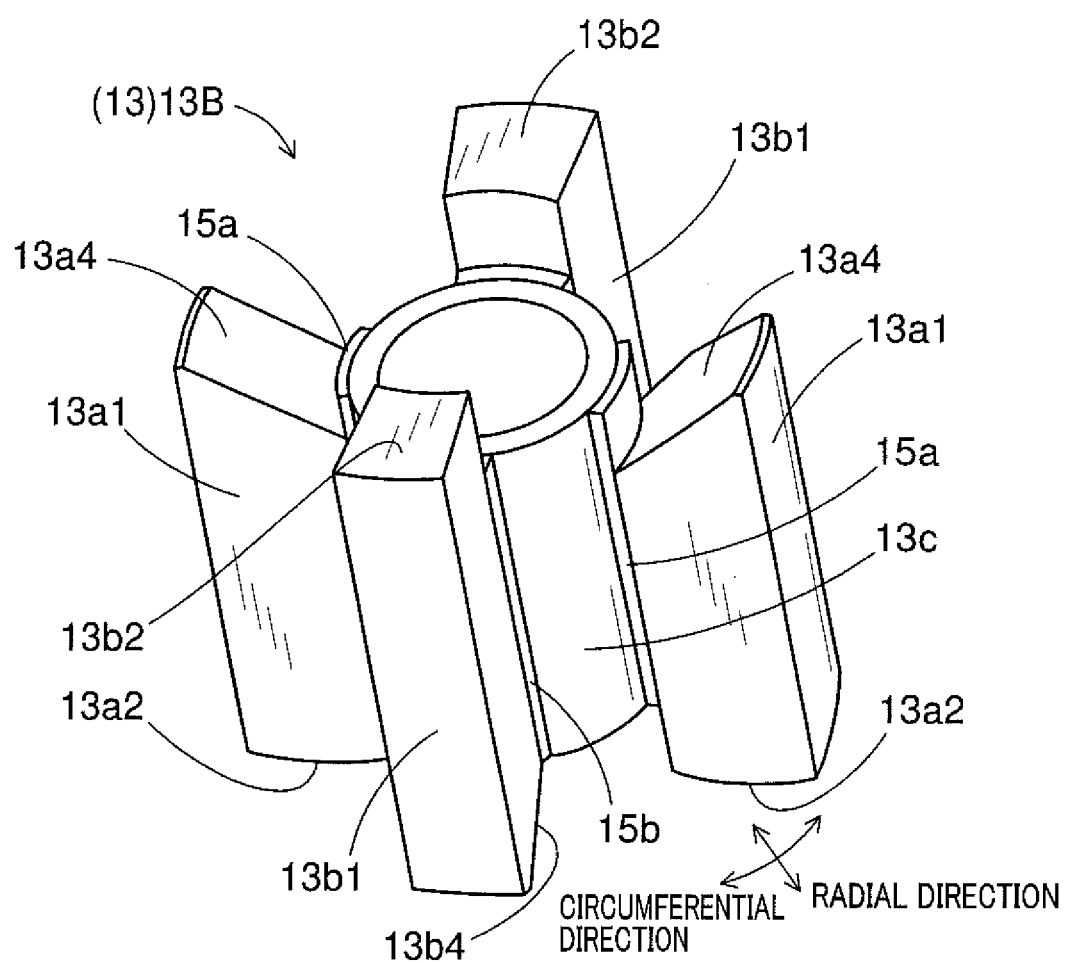
FIG. 14 is a schematic perspective view of a rotor of an AC excitation synchronous rotating electric machine according to a second embodiment.

FIG. 14 shows the configuration of a rotor 13B of an AC excitation synchronous rotating electric machine 10B according to a second embodiment.

In addition, the AC excitation synchronous rotating electric machine 10B, which is a second example of the AC excitation synchronous rotating electric machine 10 according to the present invention, has almost the same structure as the AC excitation synchronous rotating electric machine 10A according to the first embodiment. Therefore, only the differences of the AC excitation synchronous rotating electric machine 10B from the AC excitation synchronous rotating electric machine 10A will be described hereinafter.

As shown in FIG. 14, in the present embodiment, the rotor 13B, which is a second example of the field-winding-less rotor 13 according to the present invention, has almost the same structure as the rotor 13A described in the first embodiment (see FIG. 4). The rotor 13B differs from the rotor 13A only in that the facing portions 13a2 and 13b2 of the magnetic poles 13a and 13b of the rotor 13B have no collars 13a3 and 13b3 formed respectively at the circumferential ends thereof.

With the rotor 13B, it is also possible to form, in the AC excitation synchronous rotating electric machine 10B, magnetic circuits MC1 and MC2 as described in the first embodiment (see FIG. 1). Consequently, it is possible to have magnetic flux ϕr flowing along the magnetic circuits MC1 and MC2. As a result, it is possible to produce exciting-current torque by supplying the multi-phase alternating current I to the multi-phase coil 12a. Moreover, since the rotor 13B also has the magnets 15a and 15b provided respectively on the radially inner surfaces of the magnetic poles 13a and 13b, it is also possible to produce magnet torque in addition to the reluctance torque produced by the magnetic flux ϕr flowing through the magnetic poles 13a and 13b.

According to the present embodiment, it is possible to achieve the advantageous effects (1)-(7) and (9) described in the first embodiment.

[Third Embodiment]

Figure 15:
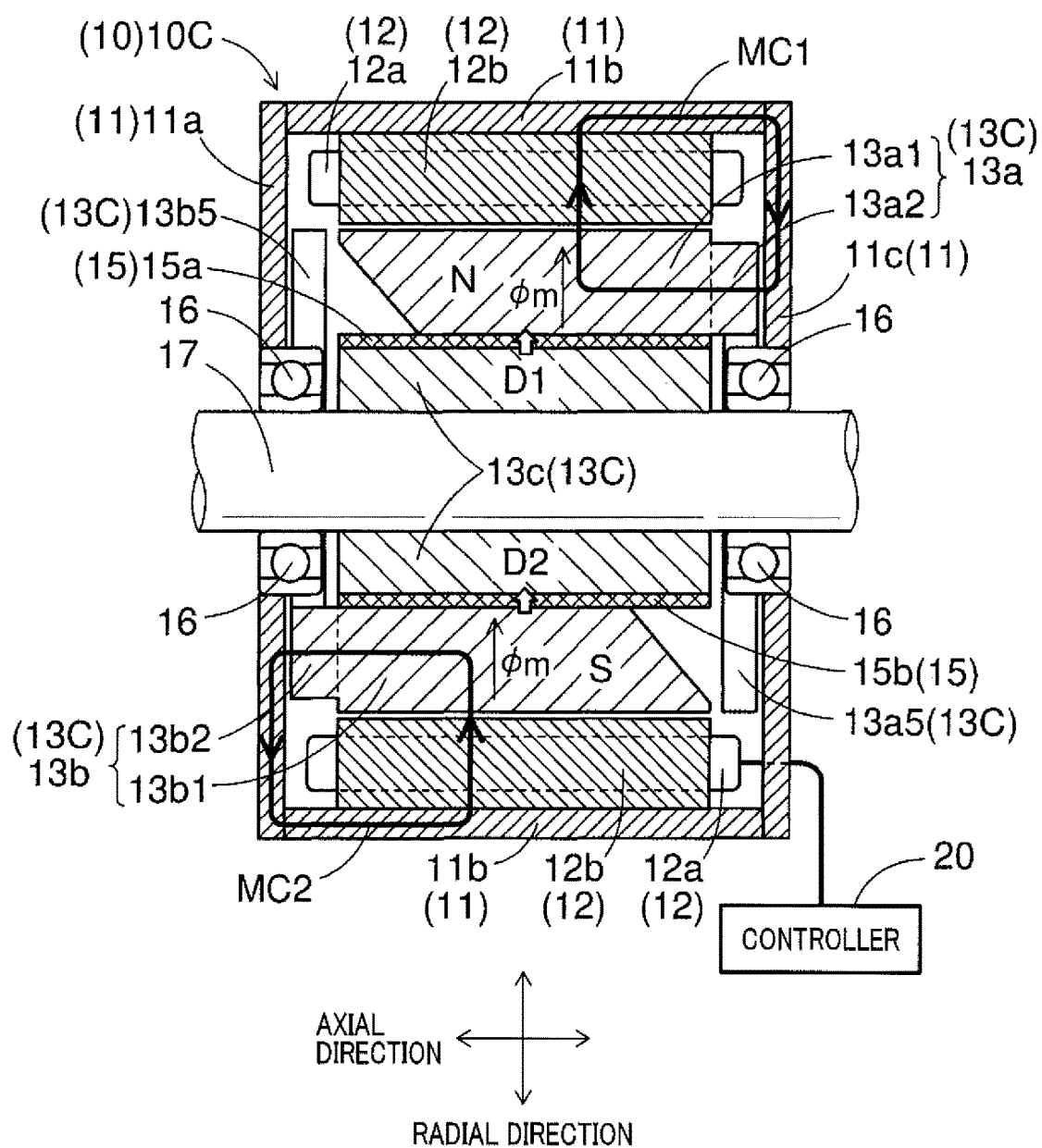
FIG. 15 is a schematic cross-sectional view of an AC excitation synchronous rotating electric machine according to a third embodiment.

FIG. 15 shows the overall configuration of an AC excitation synchronous rotating electric machine 10C according to a third embodiment.

The AC excitation synchronous rotating electric machine 10C is a third example of the AC excitation synchronous rotating electric machine 10 according to the present invention. The AC excitation synchronous rotating electric machine 10C differs from the AC excitation synchronous rotating electric machine 10A according to the first embodiment only in that the AC excitation synchronous rotating electric machine 10C includes a rotor 13C instead of the rotor 13A described in the first embodiment.

Figure 16:
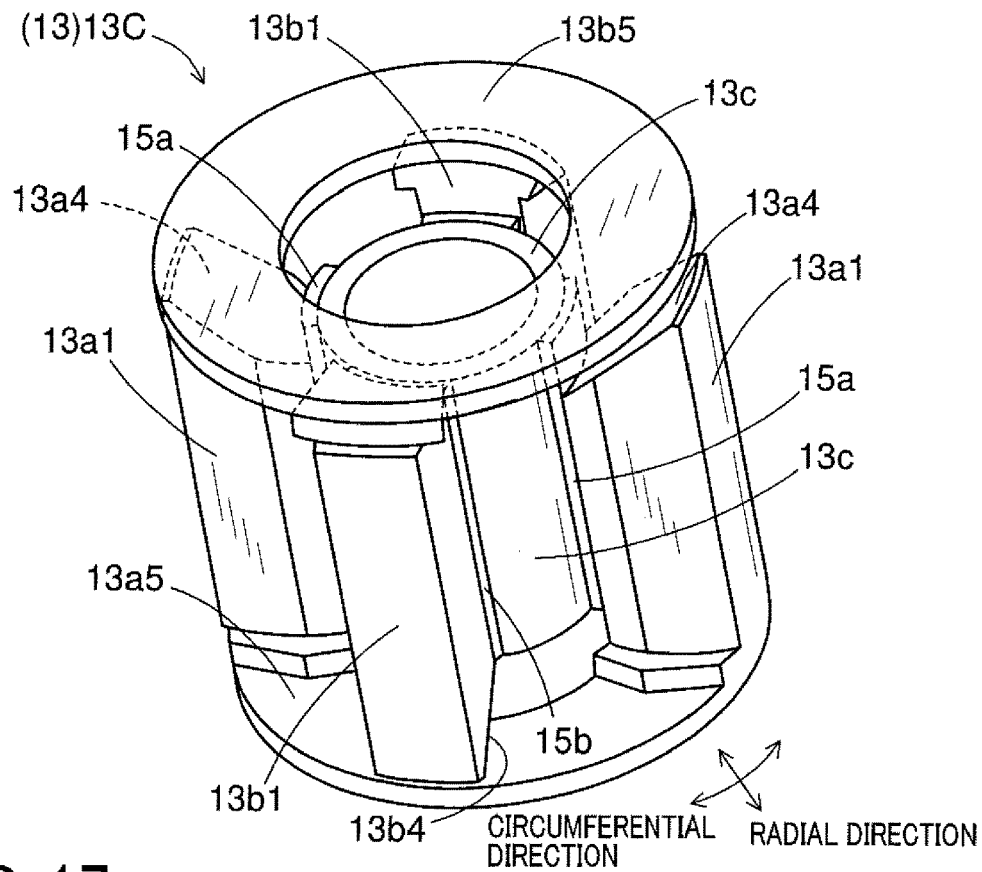
FIG. 16 is a schematic perspective view of a rotor of the AC excitation synchronous rotating electric machine according to the third embodiment.

FIG. 16 shows the configuration of the rotor 13C, which is a third example of the field-winding-less rotor 13 according to the present invention.

As shown in FIG. 16, the rotor 13C has almost the same structure as the rotor 13A described in the first embodiment (see FIG. 4). The rotor 13C differs from the rotor 13A only in that: the magnetic poles 13a are circumferentially connected with one another by an annular member 13a5; and the magnetic poles 13b are circumferentially connected with one another by an annular member 13b5. That is, all the facing portions 13a2 of the magnetic poles 13a are integrated into one piece by the annular member 13a5; all the facing portions 13b2 of the magnetic poles 13b are integrated into one piece by the annular member 13b5.

With the rotor 13C, it is also possible to form, in the AC excitation synchronous rotating electric machine 10C, magnetic circuits MC1 and MC2 as shown in FIG. 15. Consequently, it is possible to have magnetic flux ϕr flowing along the magnetic circuits MC1 and MC2. As a result, it is possible to produce exciting-current torque by supplying the multi-phase alternating current I to the multi-phase coil 12a. Moreover, since the rotor 13C also has the magnets 15a and 15b provided respectively on the radially inner surfaces of the magnetic poles 13a and 13b, it is also possible to produce magnet torque in addition to the reluctance torque produced by the magnetic flux ϕr flowing through the magnetic poles 13a and 13b.

According to the present embodiment, it is possible to achieve the advantageous effects (1)-(7) and (9) described in the first embodiment.

Moreover, according to the present embodiment, with the annular members 13a5 and 13b5 that extend continuously in the circumferential direction of the rotor 13C, it is possible to make the flows of the magnetic flux ϕr between the magnetic poles 13a and the outer yoke core 11c and between the magnetic poles 13b and the outer yoke core 11a uniform in the circumferential direction of the rotor 13C. Consequently, it is possible to secure stable rotation of the rotor 13C.

[Fourth Embodiment]

Figure 17:
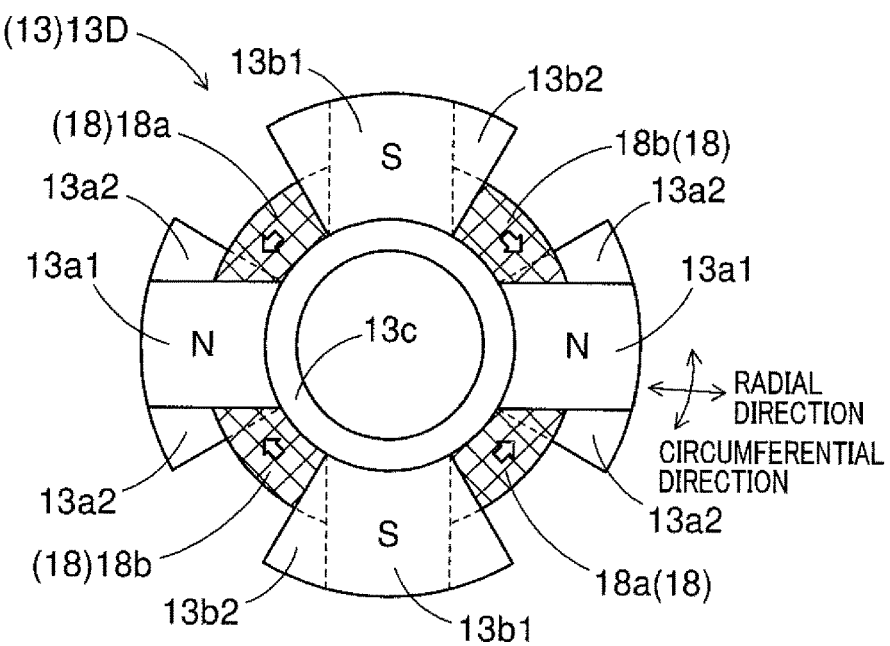
FIG. 17 is a schematic view, along an axial direction, of a rotor of an AC excitation synchronous rotating electric machine according to a fourth embodiment.

FIG. 17 shows the configuration of a rotor 13D of an AC excitation synchronous rotating electric machine 10D according to a fourth embodiment.

In addition, the AC excitation synchronous rotating electric machine 10D, which is a fourth example of the AC excitation synchronous rotating electric machine 10 according to the present invention, has almost the same structure as the AC excitation synchronous rotating electric machine 10A according to the first embodiment. Therefore, only the differences of the AC excitation synchronous rotating electric machine 10D from the AC excitation synchronous rotating electric machine 10A will be described hereinafter.

As shown in FIG. 17, in the present embodiment, the rotor 13D, which is a fourth example of the field-winding-less rotor 13 according to the present invention, has almost the same structure as the rotor 13A described in the first embodiment (see FIG. 4). The rotor 13D differs from the rotor 13A only in that the rotor 13D includes a plurality of magnets 18a and a plurality of magnets 18b instead of the magnets 15a and 15b described in the first embodiment.

The magnets 18a and 18b are an example of magnets 18 according to the present invention. Each of the magnets 18a and 18b is provided between one circumferentially-adjacent pair of the magnetic poles 13a and 13b (more specifically, between one circumferentially-adjacent pair of the main bodies 13a1 and 13b1 of the magnetic poles 13a and 13b).

Moreover, each of the magnets 18a is magnetized in a first circumferential direction (or counterclockwise direction) indicated by arrows in FIG. 17. On the other hand, each of the magnets 18b is magnetized in a second circumferential direction (or clockwise direction) indicated by arrows in FIG. 17; the second circumferential direction is opposite to the first circumferential direction. Furthermore, the magnets 18a are arranged alternately with the magnets 18b in the circumferential direction of the rotor 13D.

With the rotor 13D, it is also possible to form, in the AC excitation synchronous rotating electric machine 10D, magnetic circuits MC1 and MC2 as described in the first embodiment (see FIG. 1). Consequently, it is possible to have magnetic flux ϕr flowing along the magnetic circuits MC1 and MC2. As a result, it is possible to produce exciting-current torque by supplying the multi-phase alternating current I to the multi-phase coil 12a.

According to the present embodiment, it is possible to achieve the advantageous effects (1)-(6) and (8)-(9) described in the first embodiment.

Moreover, in the present embodiment, magnetic flux ϕm caused by the magnets 18a and 18b is added to the magnetic flux ϕr flowing through the magnetic poles 13a and 13b (see FIGS. 10 and 12). Consequently, magnet torque is produced by the magnetic flux ϕm in addition to the reluctance torque produced by the magnetic flux ϕr. As a result, the total torque F of the AC excitation synchronous rotating electric machine 10D is increased.

[Fifth Embodiment]

Figure 18:
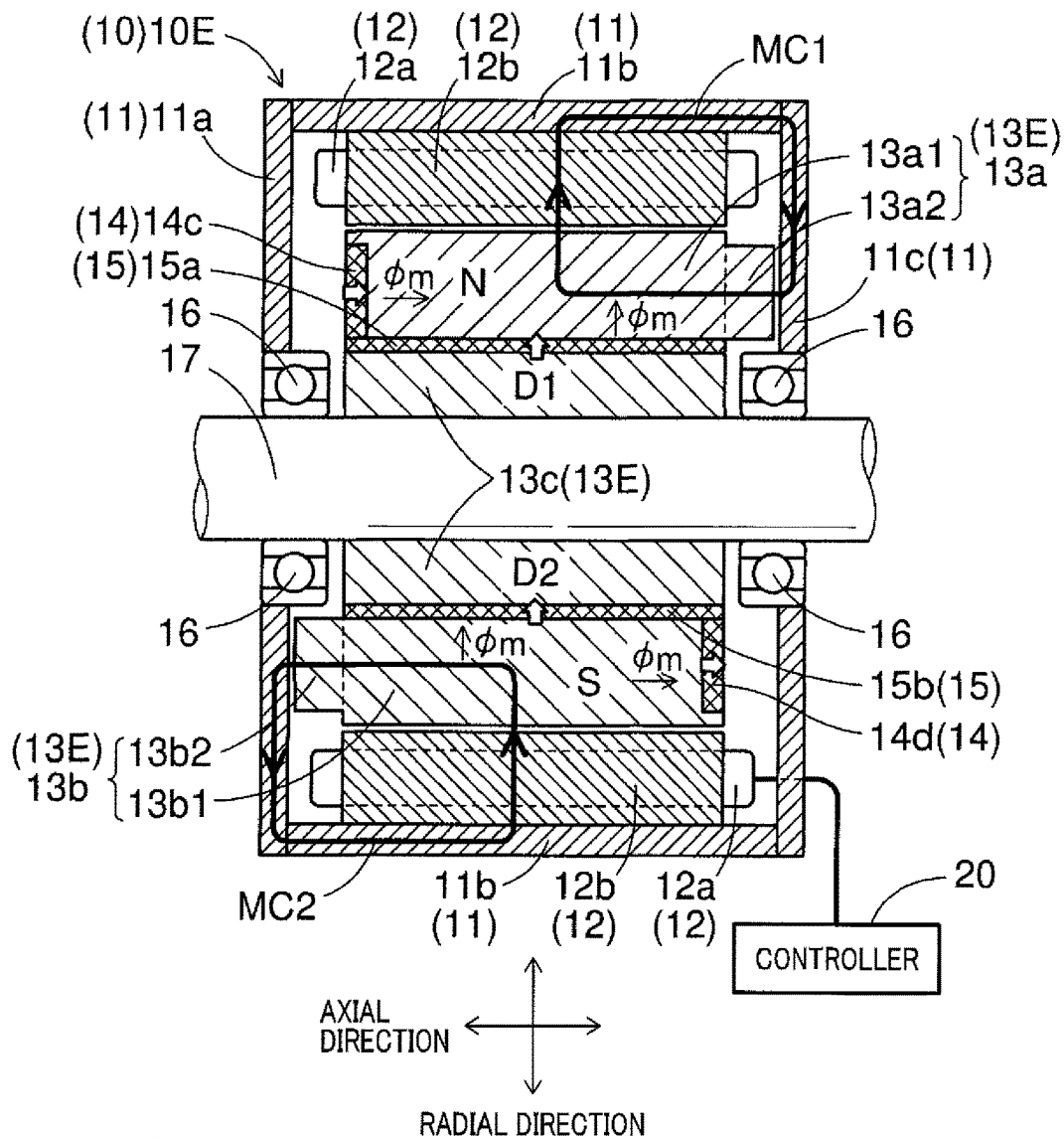
FIG. 18 is a schematic cross-sectional view of an AC excitation synchronous rotating electric machine according to a fifth embodiment.

FIG. 18 shows the overall configuration of an AC excitation synchronous rotating electric machine 10E according to a fifth embodiment.

The AC excitation synchronous rotating electric machine 10E is a fifth example of the AC excitation synchronous rotating electric machine 10 according to the present invention. The AC excitation synchronous rotating electric machine 10E differs from the AC excitation synchronous rotating electric machine 10A according to the first embodiment only in that the AC excitation synchronous rotating electric machine 10E includes a rotor 13E instead of the rotor 13A described in the first embodiment.

The rotor 13E is a fifth example of the field-winding-less rotor 13 according to the present invention.

As shown in FIG. 18, the rotor 13E has almost the same structure as the rotor 13A described in the first embodiment (see FIG. 1). The rotor 13E differs from the rotor 13A only in that: the magnetic poles 13a and 13b of the rotor 13E have no taper portions 13a4 and 13b4 described in the first embodiment; the rotor 13E further includes a plurality of magnets 14c and a plurality of magnets 14d.

Each of the magnets 14c is provided at the opposite axial end (i.e., the left end in FIG. 18) of one of the magnetic poles 13a to the facing portion 13a2 of the magnetic pole 13a, and magnetized in a direction repelling the magnetic pole 13a as indicated by an arrow in FIG. 18. Consequently, each of the magnets 14c constitutes a magnetic reluctance portion 14 that impedes the magnetic flux $\phi r$ from flowing from the magnetic pole 13a to the outer yoke core 11a. Moreover, magnetic flux $\phi m$ caused by the magnets 14c acts on the magnetic circuit MC1, producing magnet torque.

Similarly, each of the magnets 14d is provided at the opposite axial end (i.e., the right end in FIG. 18) of one of the magnetic poles 13b to the facing portion 13b2 of the magnetic pole 13b, and magnetized in a direction repelling the magnetic pole 13b as indicated by an arrow in FIG. 18. Consequently, each of the magnets 14d constitutes a magnetic reluctance portion 14 that impedes the magnetic flux $\phi r$ from flowing from the magnetic pole 13b to the outer yoke core 11c. Moreover, magnetic flux $\phi m$ caused by the magnets 14d acts on the magnetic circuit MC2, producing magnet torque.

According to the present embodiment, it is possible to achieve the advantageous effects (1)-(9) described in the first embodiment.

Moreover, according to the present embodiment, with the magnets 14c and 14d, the magnetic flux $\phi r$ is impeded from flowing from the magnetic poles 13a to the outer yoke core 11a and from flowing from the magnetic poles 13b to the outer yoke core 11c. Consequently, it is possible to reliably prevent leakage of the magnetic flux $\phi r$. Furthermore, the magnet torque is produced by the magnetic flux $\phi m$, which is caused by the magnets 14c and 14d, in addition to the reluctance torque produced by the magnetic flux $\phi r$. As a result, the total torque F of the AC excitation synchronous rotating electric machine 10E is increased.

[Other Embodiments]

While the above particular embodiments have been shown and described, it will be understood by those skilled in the art that the present invention can also be embodied in various other modes without departing from the spirit of the present invention.

Figure 19:
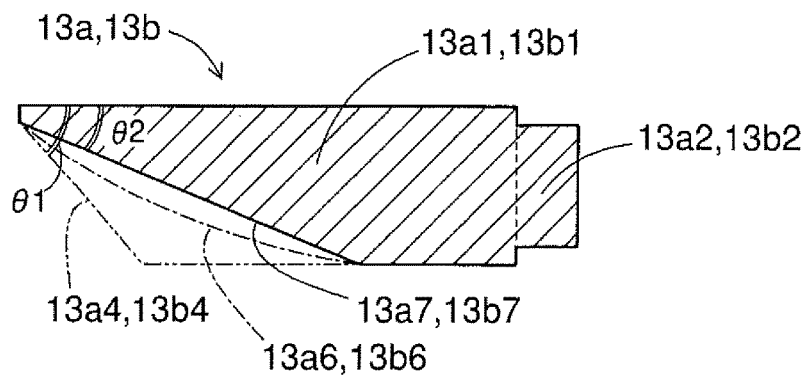
FIG. 19 is a schematic cross-sectional view illustrating the configuration of magnetic poles in the AC excitation synchronous rotating electric machines according to the first to the fourth embodiments.

For example, in the first to the fourth embodiments, the magnetic poles 13a and 13b have the respective taper portions 13a4 and 13b4 formed at a taper angle θ1 as indicated by two-dot chain lines in FIG. 19. Moreover, the taper portions 13a4 and 13b4 of the magnetic poles 13a and 13b are formed to have flat taper surfaces (or side surfaces).

However, instead of the taper portions 13a4 and 13b4, the magnetic poles 13a and 13b may have respective taper portions 13a7 and 13b7 formed at a taper angle θ2 that is less than θ1 (i.e., θ2<θ1). Moreover, the magnetic poles 13a and 13b may also have respective taper portions 13a6 and 13b6 that are formed to have curved taper surfaces (or curved side surfaces). That is to say, the magnetic poles 13a and 13b may have respective taper portions of any other shape such that the void spaces 14a and 14b can be formed to constitute the magnetic reluctance portions 14.

In the first, second, third and fifth embodiments, each of the magnetic poles 13a has the magnet 15a provided on the radially inner surface thereof; each of the magnetic poles 13b has the magnet 15b provided on the radially inner surface thereof (see FIGS. 1-2, 4, 14-16 and 18).

Figure 20:
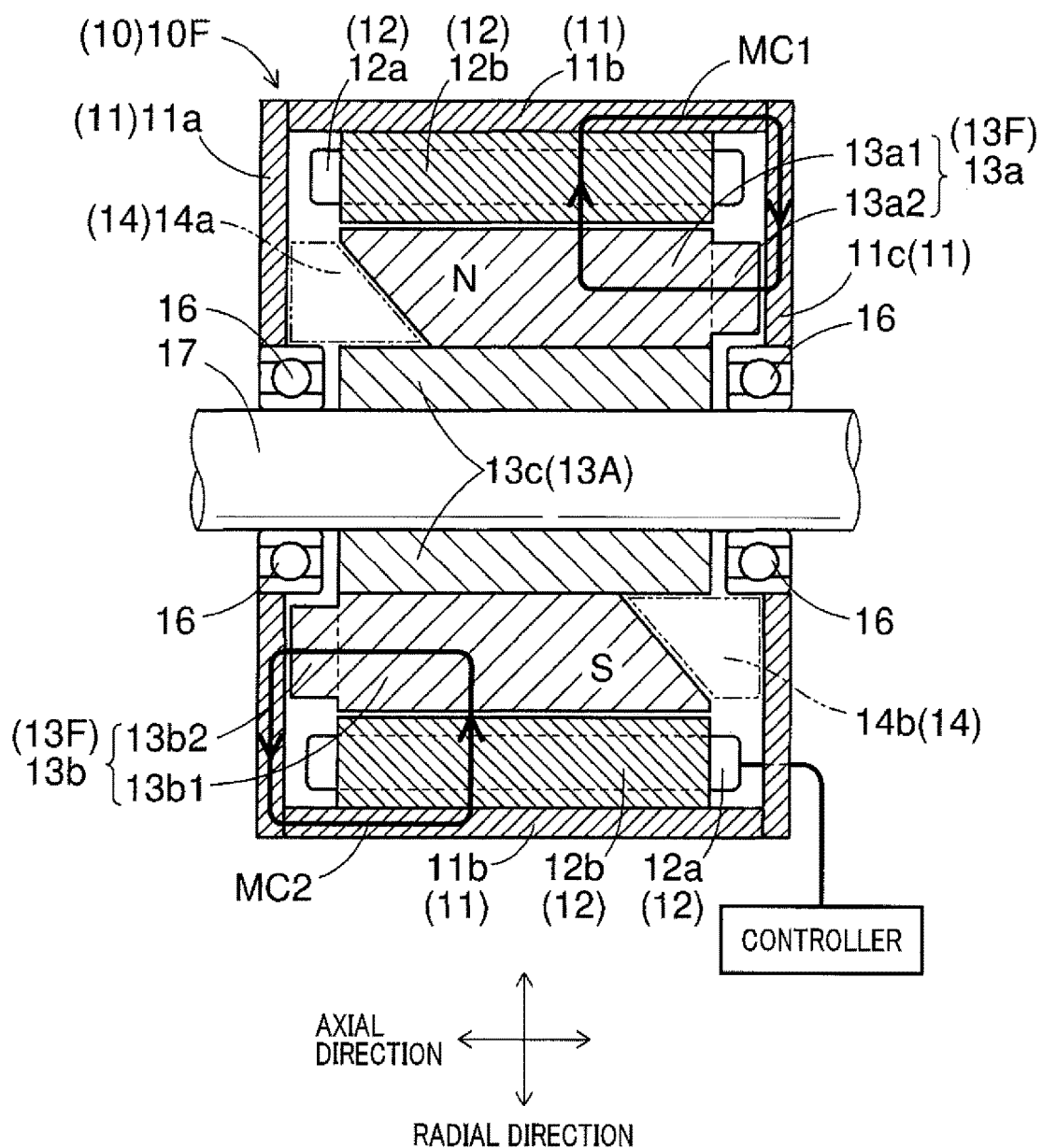
FIG. 20 is a schematic cross-sectional view of an AC excitation synchronous rotating electric machine according to a modification.

However, as shown in FIG. 20, it is possible to fix the magnetic poles 13a and 13b directly to the supporting member 13c without providing the magnets 15a and 15b on the radially inner surfaces of the magnetic poles 13a and 13b. In this case, it would be impossible to produce magnet torque; thus the total torque F of the AC excitation synchronous rotating electric machine 10 would be decreased to the characteristic line F2 shown in FIG. 13, but still be higher than the torque of a conventional rotating electric machine which includes no outer yoke cores 11a and 11c.

In the first, second, third and fifth embodiments, the magnetic poles 13a and 13b are fixed to the rotating shaft 17 via the magnets 15a and 15b and the supporting member 13c (see FIGS. 1, 15 and 18).

Figure 21:
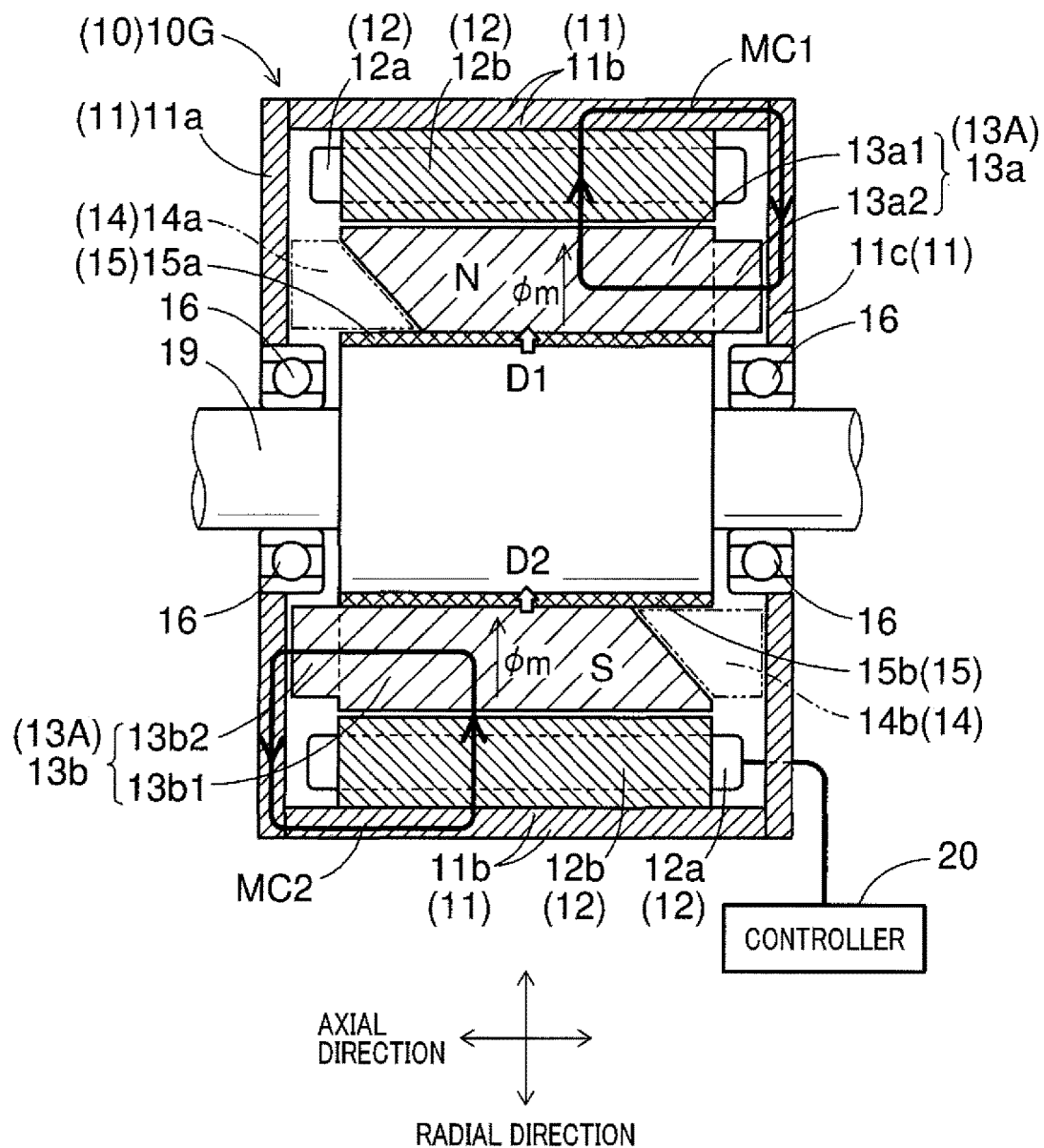
FIG. 21 is a schematic cross-sectional view of an AC excitation synchronous rotating electric machine according to another modification.

However, as shown in FIG. 21, it is possible to fix the magnetic poles 13a and 13b to a rotating shaft 19 via only the magnets 15a and 15b. Here, the rotating shaft 19 can be considered as an integrated body of the rotating shaft 17 and the supporting member 13c.

In the first to the fifth embodiments, the multi-phase coil 12a is comprised of the U-phase, V-phase and W-phase windings L1u, L2u, L1v, L2v, L1w and L2w each of which is a wave-shaped full-pitch winding (see FIGS. 5-6).

However, the multi-phase coil 12a may be wound on the armature core 12b in other manners, such as a concentrated winding or distributed winding manner. More specifically, in the concentrated winding manner, the multi-phase coil 12a is concentratedly wound on each of teeth of the armature core 12b. In the distributed winding manner, the phase windings of the multi-phase coil 12a are wound across a plurality of teeth of the armature core 12b.

In the first to the fifth embodiments, each of the magnets 15a-15b, 18a-18b and 14c-14d is formed in one piece (see FIGS. 1-2, 4 and 14-18).

However, at least one of the magnets 15a-15b, 18a-18b and 14c-14d may be formed of a plurality of magnet segments.

In the fourth embodiment, the rotor 13D includes the magnets 18a and 18b (see FIG. 17) instead of the magnets 15a and 15b included in the rotors 13A, 13B, 13C and 13E according to the first, second, third and fifth embodiments.

However, it is also possible to modify the rotor 13D to further include the magnets 15a and 15b in addition to the magnets 18a and 18b. In this case, it would be possible to obtain both the magnet torque produced by the magnets 15a and 15b and the magnet torque produced by the magnets 18a and 18b; thus, it would be possible to further improve the total torque F of the AC excitation synchronous rotating electric machine 10.

What is claimed is:

1. An AC excitation synchronous rotating electric machine comprising:
   a multi-phase coil;
   an armature core having the multi-phase coil wound thereon;
   a hollow cylindrical back yoke core disposed radially outside the armature core so as to surround the armature core;
   hollow disc-shaped outer yoke cores located on each axial side of the armature core and having no field winding provided therein, the outer yoke cores extending radially outward beyond the armature core so as to be connected with the back yoke core;

a field-winding-less rotor rotatably disposed so as to face the armature core, the rotor including a plurality of magnetic poles each of which has a facing portion and a magnetic reluctance portion, the facing portion being provided at one axial end of the magnetic pole so as to face the outer yoke core and allow magnetic flux to flow between the facing portion and the outer yoke core, the magnetic reluctance portion being provided at the other axial end of the magnetic pole to impede the magnetic flux from flowing through the magnetic reluctance portion; and a controller that controls supply of multi-phase alternating current to the multi-phase coil so that magnetomotive force generated in the armature core is applied to the magnetic poles, thereby causing the magnetic poles to operate as a DC field, wherein the back yoke core, the outer yoke cores, each of the magnetic poles of the rotor, and the armature core together form magnetic circuits which encloses an axial end portion of the multi-phase coil wound on the armature core and through which the magnetic flux flows upon supply of the multi-phase alternating current to the multi-phase coil.

2. The AC excitation synchronous rotating electric machine as set forth in claim 1, wherein the controller controls supply of the multi-phase alternating current to the multi-phase coil to have a phase angle of the magnetomotive force not equal to 0° in electrical angle, the phase angle taking a positive value in a rotational direction of the rotor with a boundary position between one pair of the magnetic poles being a reference position.

3. The AC excitation synchronous rotating electric machine as set forth in claim 2, wherein the controller controls supply of the multi-phase alternating current to the multi-phase coil to cause the AC excitation synchronous rotating electric machine to operate as an electric generator with the phase angle of the magnetomotive force being in a range of greater than 0° and less than 90° in electrical angle and as an electric motor with the phase angle being in a range of greater than −90° and less than 0° in electrical angle.

4. The AC excitation synchronous rotating electric machine as set forth in claim 3, wherein the controller controls supply of the multi-phase alternating current to the multi-phase coil to have the phase angle of the magnetomotive force being in a range of −10° to −70° or in a range of 10° to 70°.

5. The AC excitation synchronous rotating electric machine as set forth in claim 1, wherein the multi-phase coil is configured as a full-pitch coil.

6. The AC excitation synchronous rotating electric machine as set forth in claim 1, further comprising a frame that supports, at least, the armature core, wherein the outer yoke cores are provided as a part of the frame.

7. The AC excitation synchronous rotating electric machine as set forth in claim 1, further comprising a plurality of magnets each of which is provided on a radially inner surface of one of the magnetic poles and magnetized in a radial direction of the rotor.

8. The AC excitation synchronous rotating electric machine as set forth in claim 1, wherein for each of the magnetic poles, the facing portion of the magnetic pole has a pair of collars formed respectively at circumferential ends thereof so as to extend in a circumferential direction of the rotor.

9. The AC excitation synchronous rotating electric machine as set forth in claim 1, wherein for each of the magnetic poles, the magnetic reluctance portion of the magnetic pole is constituted of a void space formed at the other axial end of the magnetic pole.

10. The AC excitation synchronous rotating electric machine as set forth in claim 1, wherein the facing portions of the magnetic poles are integrated into one piece by an annular member.

11. The AC excitation synchronous rotating electric machine as set forth in claim 1, further comprising a plurality of magnets each of which is provided between one circumferentially-adjacent pair of the magnetic poles and magnetized in a circumferential direction of the rotor.

12. The AC excitation synchronous rotating electric machine as set forth in claim 1, wherein for each of the magnetic poles, the magnetic reluctance portion of the magnetic pole is constituted of a magnet that is provided at the other axial end of the magnetic pole and magnetized in a direction repelling the magnetic pole.

13. The AC excitation synchronous rotating electric machine as set forth in claim 1, wherein each of the magnetic poles of the rotor includes a main body, the facing portion formed at a first axial end of the main body, and a taper portion formed at a second axial end of the main body so as to taper in an axial direction of the rotor away from the main body.

* * * * *